US011919299B2

(12) United States Patent
Takaki

(10) Patent No.: US 11,919,299 B2
(45) Date of Patent: Mar. 5, 2024

(54) DROPLET DISCHARGE APPARATUS AND ADJUSTMENT METHOD

(71) Applicant: Hiroshi Takaki, Tokyo (JP)

(72) Inventor: Hiroshi Takaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 219 days.

(21) Appl. No.: 17/513,526

(22) Filed: Oct. 28, 2021

(65) Prior Publication Data

US 2022/0143970 A1 May 12, 2022

(30) Foreign Application Priority Data

Nov. 12, 2020 (JP) ................................ 2020-188752

(51) Int. Cl.
*B41J 2/045* (2006.01)

(52) U.S. Cl.
CPC ......... *B41J 2/0456* (2013.01); *B41J 2/04586* (2013.01)

(58) Field of Classification Search
CPC .... B41J 11/009; B41J 2/0456; B41J 2/04586; B41J 11/00
See application file for complete search history.

(56) References Cited

U.S. PATENT DOCUMENTS

| | | | | |
|---|---|---|---|---|
| 2004/0169692 A1* | 9/2004 | Sugaya | .................. | B41M 5/502 347/14 |
| 2018/0099510 A1 | 4/2018 | Niino | | |
| 2021/0245497 A1* | 8/2021 | Takahashi | .............. | B41J 2/2054 |

FOREIGN PATENT DOCUMENTS

| | | |
|---|---|---|
| JP | 2004-306350 | 11/2004 |
| JP | 2013-103339 | 5/2013 |
| JP | 2018-058320 | 4/2018 |

* cited by examiner

*Primary Examiner* — Thinh H Nguyen
(74) *Attorney, Agent, or Firm* — Duft & Bornsen, PC

(57) ABSTRACT

A droplet discharge apparatus includes a plurality of dischargers and a control device. The plurality of dischargers discharge droplets. The control device acquires characteristic values of end portions of areas on which the droplets discharged by the plurality of dischargers land, from a measurement of the end portions. The control device adjusts the plurality of dischargers such that a difference between the characteristic values is within a range.

9 Claims, 9 Drawing Sheets

DROPLET DISCHARGE APPARATUS AND ADJUSTMENT METHOD

CROSS-REFERENCE TO RELATED APPLICATION

This patent application is based on and claims priority pursuant to 35 U.S.C. § 119(a) to Japanese Patent Application No. 2020-188752, filed on Nov. 12, 2020, in the Japan Patent Office, the entire disclosure of which is incorporated by reference herein.

BACKGROUND

Technical Field

Embodiments of the present disclosure relate to a droplet discharge apparatus and an adjustment method.

Related Art

In the related art, an inkjet recording apparatus is known as a type of droplet discharge apparatus that discharges liquid in the form of droplets. The inkjet recording apparatus includes an inkjet head that discharges droplets, and is known as a technology for determining a value of a voltage applied to the inkjet head.

For example, first, an image output apparatus, which is an example of a recording apparatus, discharges ink as droplets in response to a voltage applied to an inkjet head. The image output apparatus is an apparatus that fixes droplets on a medium to print an image, and also has a function of measuring characteristics of the image such as the density or color of the image from the printed image. Further, the image output apparatus applies a plurality of voltages for measurement and discharges ink by an ink discharger to form an image. Thereafter, the image output apparatus determines the value of a voltage to be applied to the inkjet head based on the measurement voltage, a characteristic obtained by measuring an image discharged in accordance with the measurement voltage, and a target characteristic value. A technology for eliminating individual differences among inkjet heads in this manner is known.

SUMMARY

According to an embodiment of the present disclosure, there is provided a droplet discharge apparatus that includes a plurality of dischargers and a control device. The plurality of dischargers discharge droplets. The control device acquires characteristic values of end portions of areas on which the droplets discharged by the plurality of dischargers land, from a measurement of the end portions. The control device adjusts the plurality of dischargers such that a difference between the characteristic values is within a range According to another embodiment of the present disclosure, there is provided an adjustment method that includes discharging droplets from a plurality of dischargers of a droplet discharge apparatus; acquiring characteristic values of end portions of areas on which the droplets discharged by the plurality of dischargers land, from a measurement of the end portions; and adjusting the plurality of dischargers such that a difference between the characteristic values is within a range.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
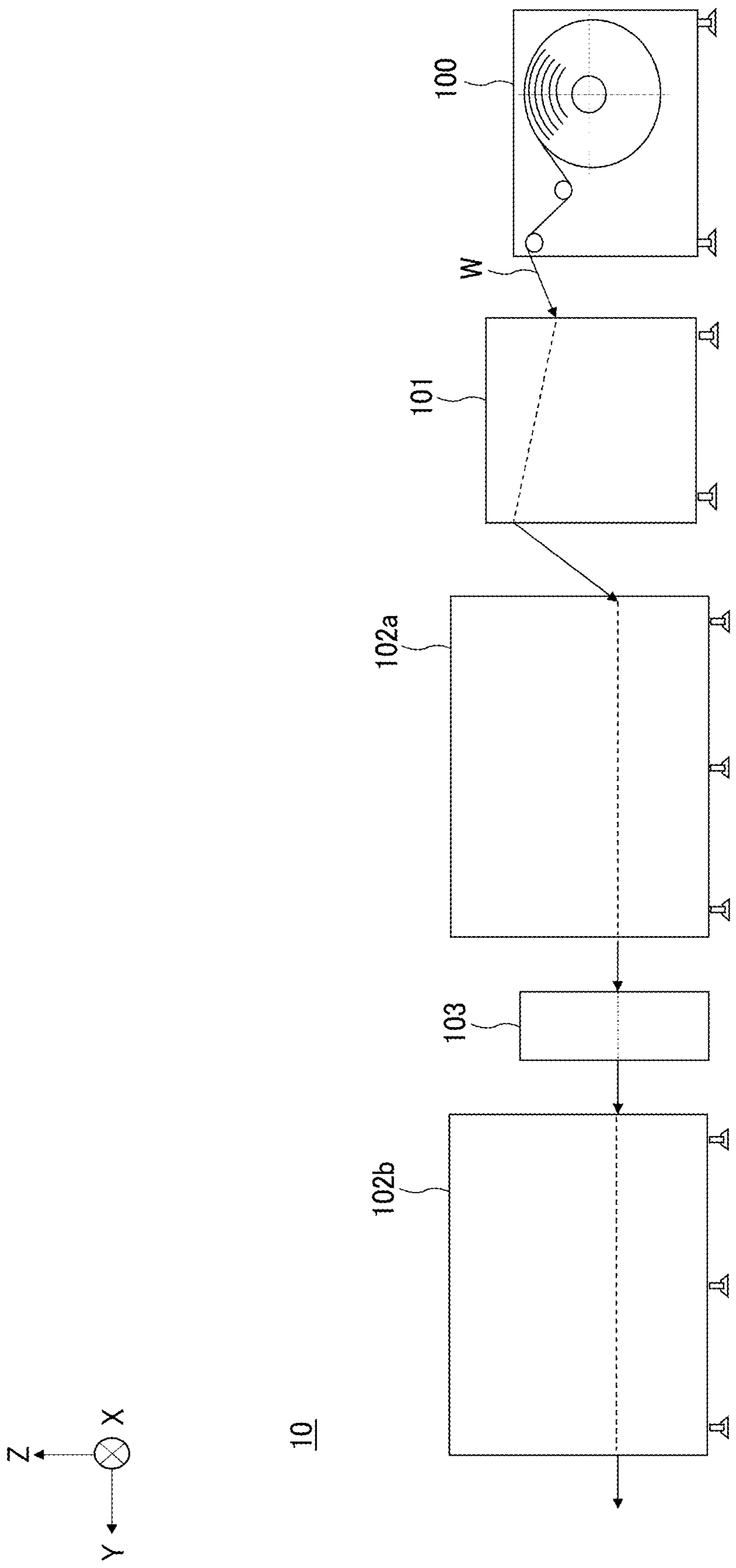
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments of the present disclosure will be described with reference to the drawings. Note that the embodiments are not limited to the illustrated examples and the specific examples described below.

Overall Configuration

FIG. 1 is a diagram illustrating an overall configuration of an image forming system according to an embodiment of the present disclosure. Hereinafter, an example in which a conveyed object is a recording medium such as a sheet of paper W (hereinafter, simply referred to as sheet W) will be described. For example, a droplet discharge apparatus according to the present embodiment is, for example, a first inkjet printer 102*a* included in the image forming system 10 described below.

In the following example, it is assumed that the sheet W is conveyed from right to left in FIG. 1. In the following description, the direction in which the sheet W is conveyed (hereinafter, simply referred to as a "conveyance direction") may be referred to as a "Y direction". On the other hand, the conveyance direction, that is, a direction perpendicular to the surface of the sheet W (the vertical direction in FIG. 1) may be referred to as a "Z direction".

In the present embodiment, the width direction of the sheet W is referred to as an "X direction". Furthermore, the following description is of an example in which heads are arranged in the X direction.

For example, the image forming system 10 includes a sheet feeding apparatus 100, a treatment-liquid applying apparatus 101, a first inkjet printer 102*a*, a reversing apparatus 103, and a second inkjet printer 102*b*. The first inkjet printer 102*a* and the second inkjet printer 102*b* are examples of droplet discharge apparatuses.

The sheet W is an example of a conveyed object. In this manner, the conveyed object is, for example, roll paper.

The sheet feeding apparatus 100 conveys a sheet W to the treatment-liquid applying apparatus 101.

The treatment-liquid applying apparatus 101 performs pretreatment on the sheet W. For example, the treatment-liquid applying apparatus 101 applies treatment liquid to the front and back sides of the sheet W.

The first inkjet printer 102*a* discharges droplets of ink or the like onto the sheet W to form an image on the sheet W. For example, the first inkjet printer 102*a* forms an image according to image data on the surface of the sheet W.

The reversing apparatus 103 reverses the front and back sides of the sheet W.

The second inkjet printer 102*b* discharges droplets of ink or the like onto the sheet W to form an image on the sheet W. For example, the second inkjet printer 102*b* forms an image according to image data on the back side of the sheet W.

Note that the image forming system 10 is not limited to the configuration illustrated in FIG. 1. For example, an image forming system according to an embodiment of the present disclosure may further include an apparatus that performs pre-treatment or post-processing other than the types illustrated in FIG. 1. Alternatively, an image forming system according to an embodiment of the present disclosure may include one conveyance apparatus or three or more conveyance apparatuses.

Configuration Example of Detecting Position of Conveyed Object

Figure 2:
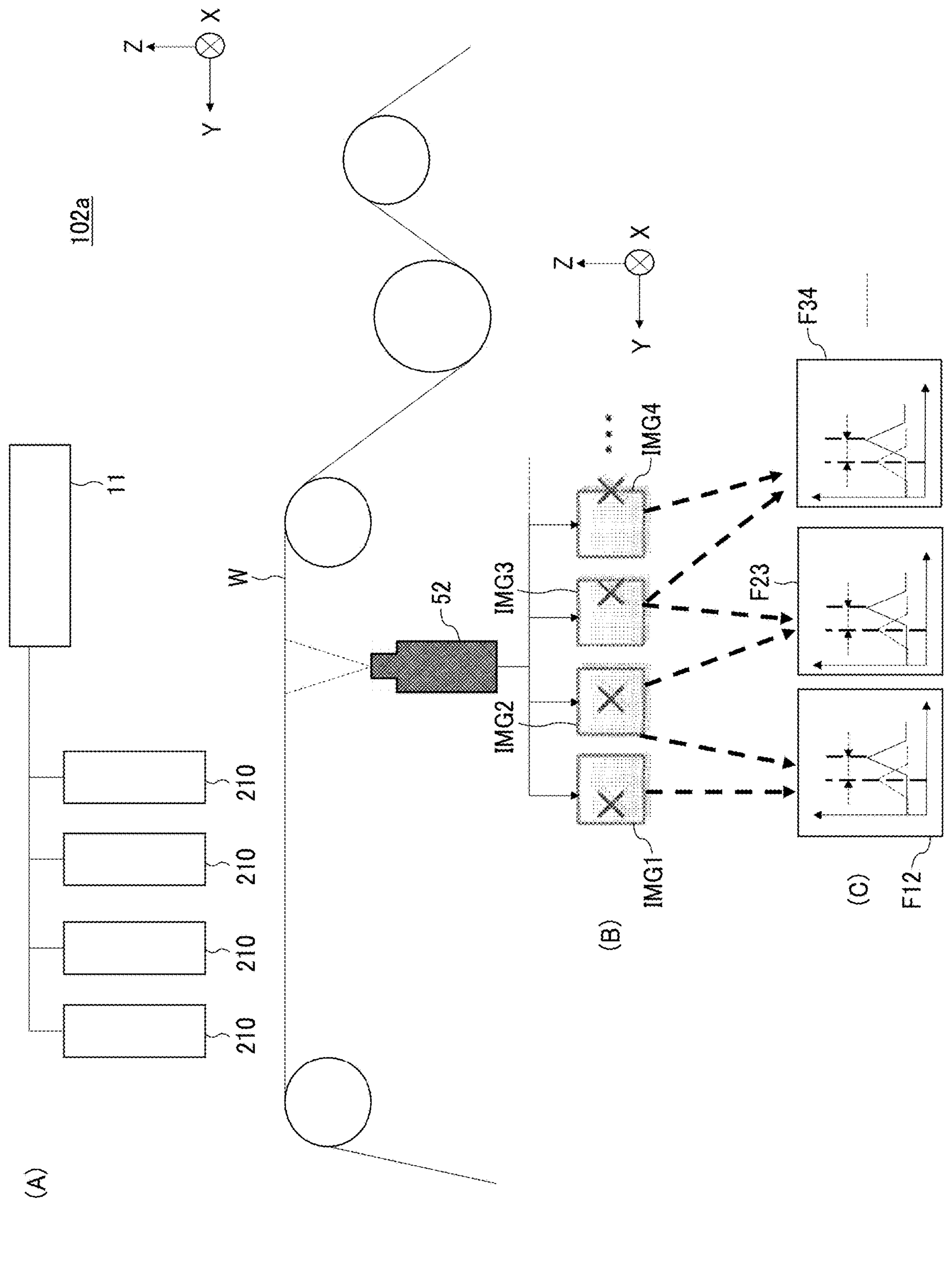
FIG. 2 is a diagram illustrating a configuration of detecting the position of a conveyed object using an image sensor, according to an embodiment of the present disclosure.

FIG. 2 is a diagram illustrating an example of the configuration of detecting the position of a conveyed object using an image sensor. For example, it is desirable that a conveyance apparatus has the following configuration.

As illustrated in part (A) of FIG. 2, the first inkjet printer 102*a* has a hardware configuration including an image sensor 52.

The image sensor 52 captures an image of a conveyed sheet W to generate image data. Specifically, the image sensor 52 captures an image of a surface portion of the sheet W at a period set in advance.

Part (B) of FIG. 2 is a schematic diagram illustrating a period in which the image sensor 52 captures an image. Hereinafter, the image data will be referred to as "first image data IMG1", "second image data IMG2", "third image data IMG3", "fourth image data IMG4", . . . in the order of capturing.

Then, the first inkjet printer 102*a* performs a frequency-analysis process such as fast Fourier transform (FFT) on image data. The first inkjet printer 102*a* calculates a peak of image correlation between two pieces of image data using the result of the frequency-analysis process.

Part (C) of FIG. 2 is a diagram illustrating an example of the result of frequency analysis. For example, the first inkjet printer 102*a* generates a first analysis result F12 based on first image data IMG1 and second image data IMG2. Similarly, the first inkjet printer 102*a* generates a second analysis result F23 based on the second image data IMG2 and third image data IMG3. Subsequently, the first inkjet printer 102*a* generates a third analysis result F34 based on the third image data IMG3 and fourth image data IMG4. In each analysis result, a peak is calculated.

The first inkjet printer 102*a* calculates the conveyance amount based on the peak calculated in this manner. For example, the first inkjet printer 102*a* compares the positions where the peaks occur, to calculate the displacement of a pattern formed on the surface of the sheet W. Based on such a result, the first inkjet printer 102*a* generates a pulse, for example, each time the feed amount reaches a certain amount.

With such a configuration, similarly to an encoder roller and the like, the first inkjet printer 102*a* can generate signals indicating the conveyance amount and the like. The configuration in which the position of the sheet W is detected by the image sensor 52 can also reduce an operation of preparing a slit or the like for the sheet W in advance.

The first inkjet printer 102*a* includes a control device 11 and the like. The control device 11 is, for example, a device including an arithmetic device, a storage device, a controller, an input device, an output device, and the like. The control device 11 controls devices included in the first inkjet printer 102*a* and executes predetermined processing based on a program or the like.

Example of Producing Chart

Figure 3:
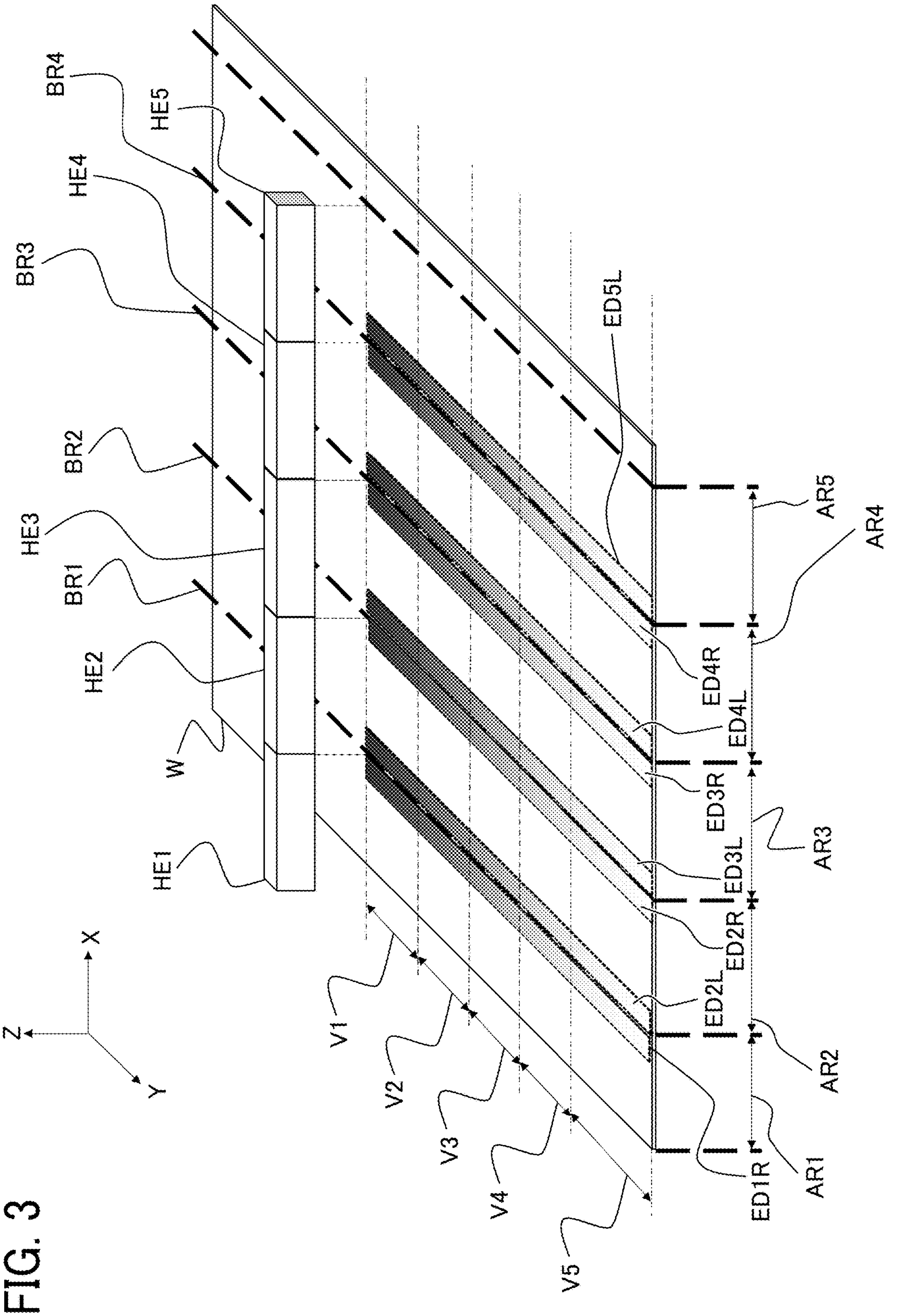
FIG. 3 is a diagram illustrating an example of producing a chart.

FIG. 3 is a diagram illustrating an example of producing a chart. For example, the first inkjet printer 102*a* produces a chart as described below, and performs adjustment based on a result of measuring the produced chart.

The following example is an example in which droplets are used as ink. The first inkjet printer 102*a* discharges droplets from dischargers to perform an image forming process.

The following example is an example in which the first inkjet printer 102*a* has five heads, which are an example of the dischargers. The number and arrangement positions of the heads may be other than those illustrated in FIG. 3.

In the example described below, the first inkjet printer 102*a* includes a first head HE1, a second head HE2, a third head HE3, a fourth head HE4, and a fifth head HE5.

For example, the first head HE1 is disposed on the leftmost side in a conveyance direction of a sheet W. The second head HE2 is adjacent to the first head HE1. Next, the second head HE2 is disposed second from the left in the conveyance direction. In FIG. 3, the first head HE1 is adjacent to the left side of the second head HE2, and the third head HE3 is adjacent to the right side of the second head HE2. Similarly, the third head HE3, the fourth head HE4, and the fifth head HE5 are disposed. The fifth head HE5 is disposed on the rightmost side in the conveyance direction.

Each of the first head HE1, the second head HE2, the third head HE3, the fourth head HE4, and the fifth head HE5 is disposed at a fixed position in the X direction.

Hereinafter, a region in which the first head HE1 discharges droplets to perform printing or the like is referred to as a "first area AR1". Similarly, an area for the second head HE2 is referred to as a "second area AR2", an area for the third head HE3 is referred to as a "third area AR3", an area for the fourth head HE4 is referred to as a "fourth area AR4", and an area for the fifth head HE5 is referred to as a "fifth area AR5".

In FIG. 3, a boundary line between adjacent heads is indicated by a broken line. Thus, the boundary line illustrated in FIG. 3 is for the sake of description and is not an image formed on the sheet W by droplets or the like. Hereinafter, a boundary line indicating a boundary between the first area AR1 and the second area AR2 is referred to as a "first boundary line BR1". A boundary line indicating a boundary between the second area AR2 and the third area AR3 is referred to as a "second boundary line BR2". Similarly, a boundary line indicating a boundary between the third area AR3 and the fourth area AR4 is referred to as a "third boundary line BR3", and a boundary line indicating a boundary between the fourth area AR4 and the fifth area AR5 is referred to as a "fourth boundary line BR4".

In the first area AR1 to the fifth area AR5, each head discharges droplets at least to an end portion serving as a boundary portion with an adjacent area (hereinafter, simply referred to as "end portion") to produce a chart.

In the example illustrated in FIG. 3, the end portion is, for example, the following portion.

A first right end portion ED1R is an end portion located on the right side in the first area AR1. The first right end portion ED1R is an end portion located at the boundary between the first area AR1 and the second area AR2.

A second left end portion ED2L is an end portion located on the left side in the second area AR2. The second right end portion ED2R is an end portion located at the boundary between the first area AR1 and the second area AR2.

Accordingly, in a case where the first discharger is the first head HE1 and the second discharger is the second head HE2, an end portion of the first discharger is the first right end portion ED1R and an end portion of the second discharger is the second left end portion ED2L.

Note that the combination of the first discharger and the second discharger may be a combination other than the combination of the first head HE1 and the second head HE2. For example, the combination of the first discharger and the second discharger may be a combination in which the first discharger is the third head HE3 and the second discharger is the fourth head HE4. In this combination, the end portion of the first discharger is the third right end portion ED3R, and the end portion of the second discharger is the fourth left end portion ED4L.

Similarly, this example is an example in which the dischargers are adjacent to each other at any boundary of the first boundary line BR1 to the fourth boundary line BR4. Therefore, the first discharger and the second discharger may be a combination of heads that are adjacent to each other at any of the boundary lines indicated by the first boundary line BR1, the second boundary line BR2, the third boundary line BR3, and the fourth boundary line BR4.

The droplet discharge apparatus drives the discharger with different voltages in the conveyance direction. Hereinafter, a description is given of an example in which the voltage is divided into five stages of a first voltage value V1, a second voltage value V2, a third voltage value V3, a fourth voltage value V4, and a fifth voltage value V5 in the conveyance direction.

For example, the first voltage value V1 is the highest voltage. The voltage decreases in the order of the second voltage value V2, the third voltage value V3, and the fourth voltage value V4. The fifth voltage value V5 is the lowest voltage. Accordingly, the density is the highest at a portion where discharge is performed by the first voltage value V1. On the other hand, the density is the lowest at a portion where discharge is performed by the fifth voltage value V5.

The setting of the voltage is not limited to the above example. For example, the voltage may be divided into six or more stages or four or fewer stages.

In addition, the voltage is not limited to the order in which the density increases or decreases in the order of the first voltage value V1, the second voltage value V2, the third voltage value V3, the fourth voltage value V4, and the fifth voltage value V5. That is, the end portions are not limited to a configuration in which the density gradually increases or decreases, and may be, for example, a configuration in which the density rapidly changes. Therefore, the first voltage value V1, the second voltage value V2, the third voltage value V3, the fourth voltage value V4, and the fifth voltage value V5 may be different values.

For example, any voltage values of from "−6 volts (V)" to "+6V" are set in advance to the first voltage value V1, the second voltage value V2, the third voltage value V3, the fourth voltage value V4, and the fifth voltage value V5. Note that the values set for the first voltage value V1, the second voltage value V2, the third voltage value V3, the fourth voltage value V4, and the fifth voltage value V5 are determined by the specifications of the dischargers and the like.

Each head discharges droplets to the end portion(s) as described above. In this manner, a chart is produced. When an end portion of the chart is measured by a colorimeter or the like, a characteristic value is obtained.

End Portion

The end portion may be a part of an area serving as a boundary with an adjacent area. For example, since a combination of end portions are adjacent to each other, the a combination of end portions is often used for image formation on the same surface or the like. Accordingly, since the respective end portions form an image on the same surface, even different heads may discharge droplets so as to form substantially the same color. That is, this is a case where one image pattern is formed across different adjacent heads.

As described above, the end portions is a continuous portion in forming an image of the same object as the object of another discharger, and is a portion in which image quality is affected if there is variation in characteristics. Therefore, the end portion is set to have a different dimension depending on conditions such as resolution, the number of nozzles, or the configuration of the heads.

Similarly, the droplet discharge apparatus may form a so-called gradation image using a plurality of heads. Even in such a case, it is assumed that adjacent heads have the same characteristics, and image formation is performed such that the density or the like is gradually changed continuously. Even in such a case, if the characteristics at the end portion are different between different heads, the image quality is often affected.

In addition, the end portion may be a portion determined by the resolution of a colorimeter. For example, the resolution of the colorimeter is 6 millimeters (±4.5 millimeters) or the like. However, the resolution of the colorimeter varies depending on the specifications of the colorimeter. That is, the dimension of the end portion may be a minimum unit or the like that can be measured by the colorimeter.

As described above, the end portion is not limited to a portion from which droplets are discharged by one nozzle of a head. That is, in the inkjet method, a head may perform processing such as image formation on an end portion using a plurality of nozzles. Therefore, one nozzle or a plurality of nozzles may be used to perform discharge to the end portion.

Example of Overall Processing

Figure 4:
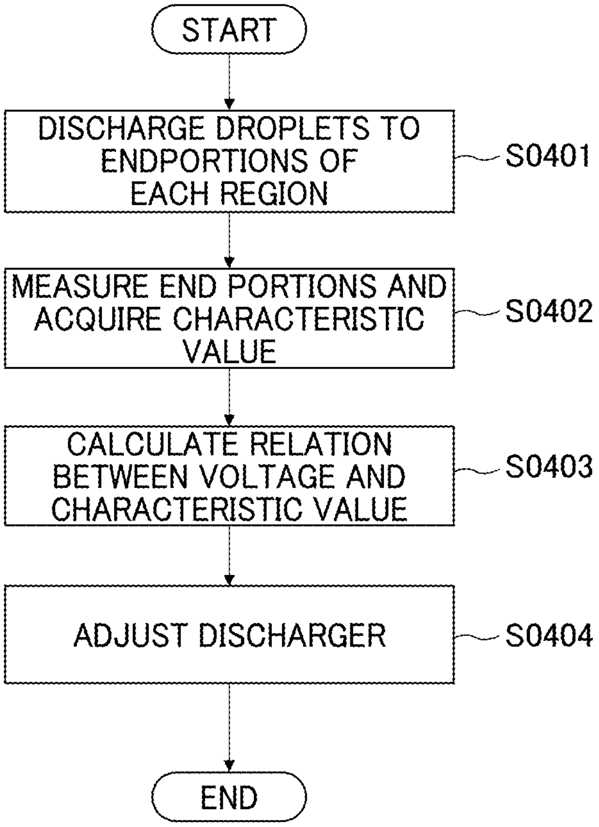
FIG. 4 is a diagram illustrating an example of overall processing.

FIG. 4 is a diagram illustrating an example of overall processing. For example, the droplet discharge apparatus performs producing of a chart, acquisition of characteristic values, and adjustment as follows.

In step S0401, the droplet discharge apparatus discharges droplets to each end portion in each area. For example, the droplet discharge apparatus produces a chart as illustrated in FIG. 3, for example.

In step S0402, the droplet discharge apparatus measures an end portion and acquires a characteristic value. For example, the characteristic value is measured by a colorimeter or the like. The colorimeter may be a device included in the droplet discharge apparatus or may be a device provided separately from the droplet discharge apparatus.

The characteristic value is, for example, a density. The characteristic value may be, for example, a coordinate value in a color space.

The characteristic value is measured and acquired for each voltage. For example, as illustrated in FIG. 3, in the case where the voltage is set in five stages, five characteristic values of the first voltage value V1, the second voltage value V2, the third voltage value V3, the fourth voltage value V4, and the fifth voltage value V5 are measured and acquired for each end portion.

In step S0403, the droplet discharge apparatus calculates the relation between the voltage and the characteristic value. For example, the droplet discharge apparatus calculates the relation between the voltage and the characteristic value as follows.

Figure 5:
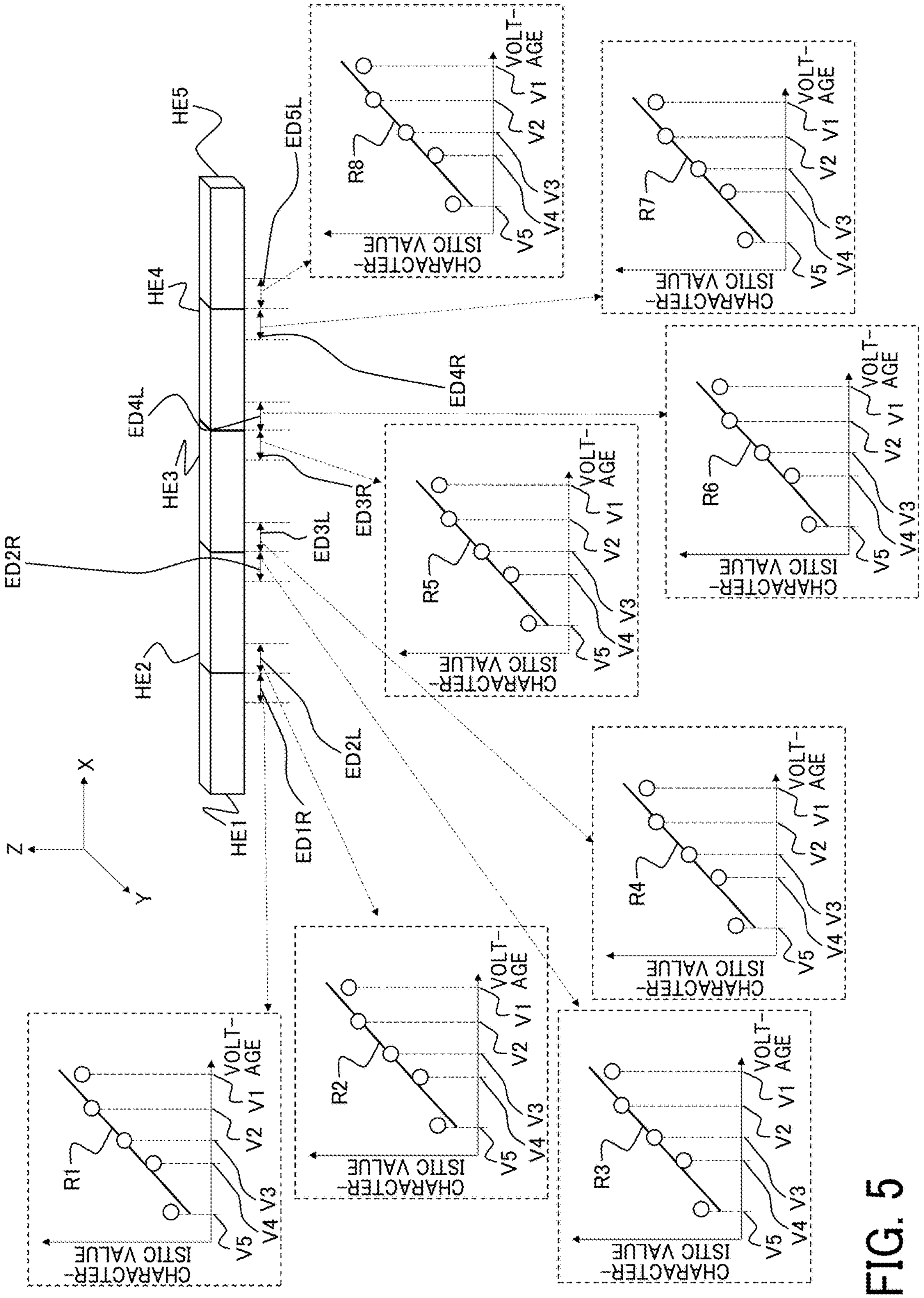
FIG. 5 is a diagram illustrating an example of the relation between voltage and characteristic value.

FIG. 5 is a diagram illustrating an example of the relation between the voltage and the characteristic value. For example, in the example of the heads and the end portions illustrated in FIG. 3, the droplet discharge apparatus calculates the relation between the voltage and the characteristic value for each end portion as follows.

The relation between the voltage and the characteristic value is calculated, for example, in the form of a linear equation. Hereinafter, in the first right end portion ED1R, the relation between the voltage and the characteristic value is a relation indicated by a "first formula R1". Further, in the second left end portion ED2L, the relation between the voltage and the characteristic value is a relation indicated by a "second formula R2", and in the second right end portion ED2R, the relation between the voltage and the characteristic value is a relation indicated by a "third formula R3".

Further, in the third left end portion ED3L, the relation between the voltage and the characteristic value is a relation indicated by a "fourth formula R4", and in the third right end portion ED3R, the relation between the voltage and the characteristic value is a relation indicated by a "fifth formula R5".

Similarly, in the fourth left end portion ED4L, the relation between the voltage and the characteristic value is a relation indicated by a "sixth formula R6", and in the fourth right end portion ED4R, the relation between the voltage and the characteristic value is a relation indicated by a "seventh formula R7". Further, in the fifth left end portion ED5L, the relation between the voltage and the characteristic value is a relation indicated by an "eighth formula R8".

The first formula R1 to the eighth formula R8 are cases where the relation between the voltage and the characteristic value is assumed to be linear. First, in order to calculate the first formula R1 to the eighth formula R8, the droplet discharge apparatus plots discharge characteristic values (five points in this example) according to the respective voltage values with respect to the first voltage value V1, the second voltage value V2, the third voltage value V3, the fourth voltage value V4, and the fifth voltage value V5. These five points are acquired in step S0402.

Next, for the five points, the droplet discharge apparatus calculates linear expressions from the first formula R1 to the eighth formula R8 by, for example, a least square method. Note that the droplet discharge apparatus may perform calculation using a calculation method other than the least squares method.

Note that the relation between the voltage and the characteristic value is not limited to the calculation based on linear assumption. For example, the relation between the voltage and the characteristic value may be calculated by a function of a quadratic function or more, or may be determined by a table or the like.

As described above, when the relations among the first formula R1 to the eighth formula R8 are calculated, the droplet discharge apparatus can specify a voltage having an arbitrary characteristic value based on the first formula R1 to the eighth formula R8.

In step S0404, the droplet discharge apparatus adjusts the dischargers. For example, the droplet discharge apparatus adjusts the dischargers as follows.

Figure 6:
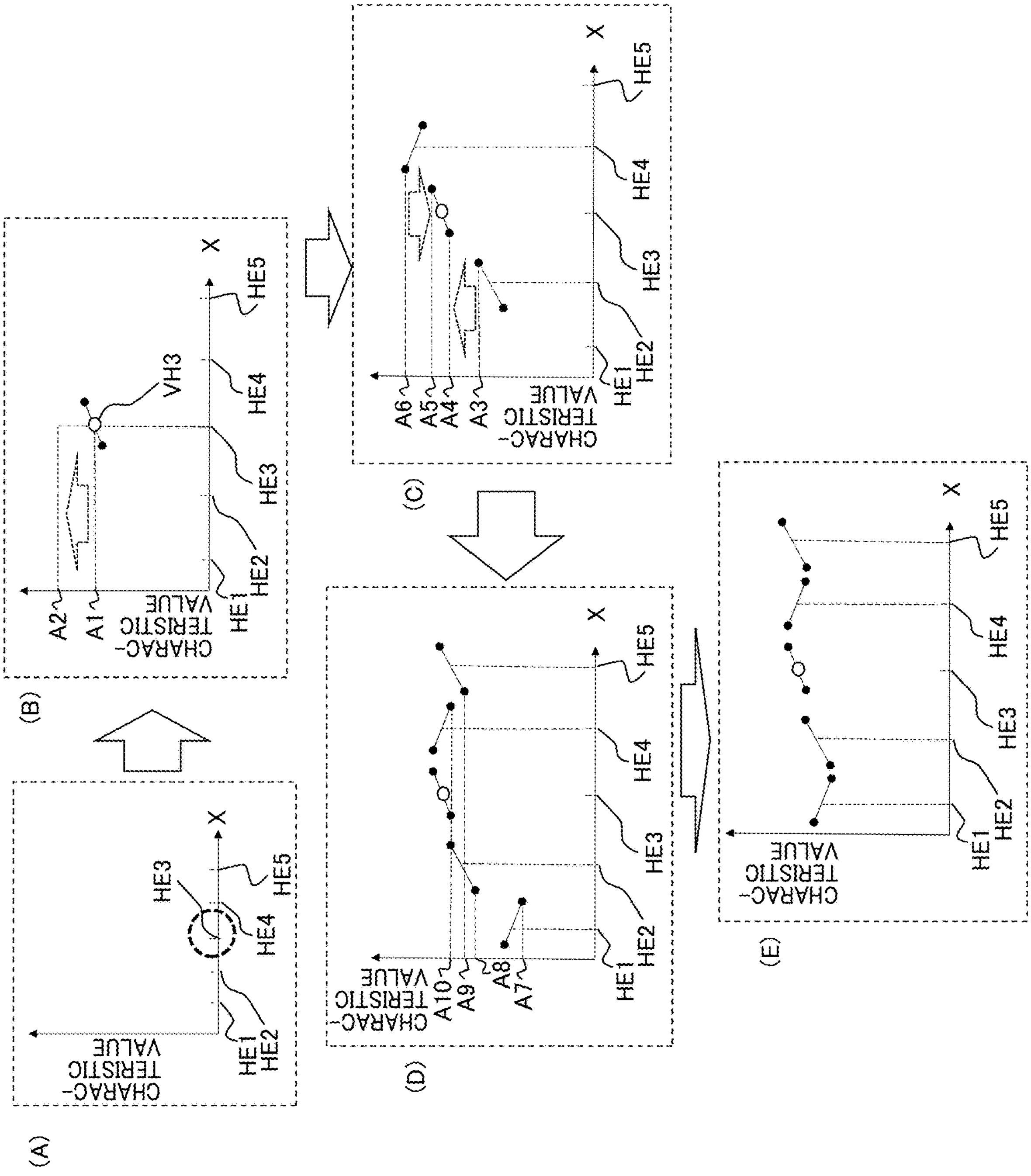
FIG. 6 is a diagram illustrating an example of adjustment.

FIG. 6 is a diagram illustrating an example of adjustment. For example, the droplet discharge apparatus performs processing in the order of parts (A), (B), (C), (D), and (E) of FIG. 6 to adjust the dischargers.

As illustrated in part (A) of FIG. 6, the following description is about an example in which five heads of the first head HE1 to the fifth head HE5 illustrated in FIG. 3 are adjusted.

Part (A) of FIG. 6 is a diagram illustrating an example in which the third head HE3 is determined to be a head as the center of adjustment. For example, the head as the center of adjustment is set in advance in the droplet discharge apparatus. That is, in this example, the third head HE3 is an example of the discharger positioned at the center, among the five heads, in the direction in which the plurality of dischargers are arranged.

Part (B) of FIG. 6 is a diagram illustrating an example of adjustment the third head HE3. For example, the droplet discharge apparatus may adjust an average characteristic value in the third head HE3 (hereinafter simply referred to as "average characteristic value VE3") to adjust the third head HE3. Note that the discharger to be initially adjusted may be adjusted by a method other than the method of adjusting the average characteristic value VH3.

The average characteristic value VH3 is, for example, a value obtained by averaging characteristic values of both end portions of one head.

The average characteristic value VH3 is assumed to be a pre-adjustment value A1 before adjustment. In the adjustment of the third head HE3, the droplet discharge apparatus adjusts the pre-adjustment value A1 to an adjusted value A2.

The adjusted value A2 is, for example, a value obtained by averaging all acquired characteristic values. The adjusted value A2 is not limited to an average value of all the characteristic values. For example, when the characteristic values of all heads are set to high values, it is desirable to set the adjusted value A2 to a high value. In this manner, the characteristic values of the entire heads can be adjusted to have a predetermined tendency by the value set to the adjusted value A2.

Part (C) of FIG. 6 is a diagram illustrating an example of adjustment of the heads adjacent to the third head HE3. For example, in the adjustment illustrated in part (C) of FIG. 6, the droplet discharge apparatus performs adjustment so that a characteristic value of a left end portion of the third head HE3 (hereinafter referred to as "third-head left-end-portion value A4") and a characteristic value of a right end portion of the second head HE2 (hereinafter referred to as "second-head right-end-portion value A3") match each other.

In addition, in the adjustment illustrated in part (C) of FIG. 6, the droplet discharge apparatus performs adjustment such that a characteristic value of a right end portion of the third head HE3 (hereinafter, referred to as a "third-head right-end-portion value A5") and a characteristic value of a left end portion of the fourth head HE4 (hereinafter, referred to as a "fourth-head left-end-portion value A6") match each other.

The second-head right-end-portion value A3 is a characteristic value for the second right end portion ED2R.

The third-head left-end-portion value A4 is a characteristic value for the third left end portion ED3L.

Therefore, the second-head right-end-portion value A3 and the third-head left-end-portion value A4 are characteristic values obtained by measuring the result of discharging droplets to each of end portions of adjacent areas. Thus, in the example in which the third head HE3 and the fourth head HE4 are used as the first discharger and the second discharger, the first characteristic value is the second-head right-end-portion value A3, and the second characteristic value is the third-head left-end-portion value A4.

The droplet discharge apparatus performs adjustment so as to eliminate the difference in the characteristic values. That is, in this example, the difference between the characteristic values becomes zero when the second-head right-end-portion value A3 and the third-head left-end-portion value A4 match each other.

In addition, for example, the droplet discharge apparatus fixes one of the second-head right-end-portion value A3 and the third-head left-end-portion value A4 and sets the other to be the same as the one. Alternatively, the droplet discharge apparatus may calculate an average value and set both the second-head right-end-portion value A3 and the third-head left-end-portion value A4 to be equal to the average value.

Similarly, the droplet discharge apparatus performs adjustment to eliminate the difference between the characteristic values of the third-head right-end-portion value A5 and the fourth-head left-end-portion value A6.

The third-head right-end-portion value A5 is a characteristic value for the third right end portion ED3R.

The fourth-head left-end-portion value A6 is a characteristic value for the fourth left end ED4L.

Therefore, the third-head right-end-portion value A5 and the fourth-head left-end-portion value A6 are characteristic values obtained by measuring the result of discharging droplets to each of end portions of adjacent areas.

As in the case of the second-head right-end-portion value A3 and the third-head left-end-portion value A4, the droplet discharge apparatus adjusts the third-head right-end-portion value A5 and the fourth-head left-end-portion value A6 so as to match each other.

Part (D) of FIG. 6 is a diagram illustrating an example of adjustment of heads adjacent to the second head HE2 and the fourth head HE4. For example, in the adjustment illustrated in part (D) of FIG. 6, the droplet discharge apparatus performs adjustment such that a characteristic value of a left end portion of the second head HE2 (hereinafter referred to as "second-head left-end-portion value A8") and a characteristic value of a right end portion of the first head HE1 (hereinafter referred to as "first-head right-end-portion value A7") match each other.

In addition, in the adjustment illustrated in part (D) of FIG. 6, the droplet discharge apparatus performs adjustment such that a characteristic value of a right end portion of the fourth head HE4 (hereinafter, referred to as a "fourth-head right-end-portion value A9") and a characteristic value of a left end portion of the fifth head HE5 (hereinafter, referred to as a "fifth-head left-end-portion value A10") match each other.

The second-head left-end-portion value A8 is a characteristic value for the second left end portion ED2L.

The first-head right-end-portion value A7 is a characteristic value for the first right end portion ED1R.

Therefore, the first-head right-end-portion value A7 and the second-head left-end-portion value A8 are characteristic values obtained by measuring the result of discharging droplets to each of end portions of adjacent areas. The droplet discharge apparatus performs adjustment so as to eliminate the difference in the characteristic values.

Similarly, the droplet discharge apparatus performs adjustment to eliminate the difference between the characteristic values for the fourth-head right-end-portion value A9 and the fifth-head left-end-portion value A10.

The fourth-head right-end-portion value A9 is a characteristic value for the fourth right end portion ED4R.

The fifth-head left-end-portion value A10 is a characteristic value for the fifth left end portion ED5L.

Therefore, the fourth-head right-end-portion value A9 and the fifth-head left-end-portion value A10 are characteristic values obtained by measuring the result of discharging droplets to each of end portions of adjacent areas.

As in the case of the first-head right-end-portion value A7 and the second-head left-end-portion value A8, the droplet discharge apparatus adjusts the fourth-head right-end-portion value A9 and the fifth-head left-end-portion value A10 so as to match each other.

As described above, for example, the droplet discharge apparatus sequentially adjusts the end portions of heads positioned adjacent to each other, from the head serving as the discharger positioned at the center toward the heads positioned at both end portions.

In the related art, for example, a difference in the size or the like of a droplet from each head may occur between adjacent inkjet heads (hereinafter, simply referred to as "heads"). Such a difference in size may cause a density difference in an image. The density difference is caused by, for example, individual differences of heads. Therefore, even if each head is instructed to discharge the same amount of droplets, the droplet discharge amount of each head may be different due to individual differences. As a result, when an image is formed with ink discharged by a plurality of adjacent heads, for example, there is a problem that so-called density unevenness occurs in the formed image due to a density difference of droplets in the vicinity of adjacent end portions.

Part (E) of FIG. 6 is a diagram illustrating an example of characteristic values after adjustment. As illustrated in part (E) of FIG. 6, when the difference in the characteristic values between the end portions of the heads is reduced, the difference in density between the adjacent areas can be reduced, for example, when an image is formed. When the difference in density can be reduced in this manner, density unevenness can be reduced.

Note that the adjustment of the droplet discharge apparatus is not limited to the above-described adjustment for eliminating the difference in characteristic values. In other words, the droplet discharge apparatus may perform adjustment such that the difference between the characteristic values falls within a predetermined range. For example, the predetermined range is set in advance. Therefore, the droplet discharge apparatus adjusts the characteristic values so as to reduce the difference between the characteristic values. As described above, the adjustment may be performed by a method in which the difference between the characteristic values after the adjustment is smaller than that before the adjustment.

As described above, when the adjustment is performed with the head positioned at the center as the center of the adjustment, the droplet discharge apparatus performs the adjustment in order from the second head HE2 and the fourth head HE4 that are the heads adjacent to the third head HE3. In this manner, when the adjustment is sequentially performed from the head positioned at the center, the heads positioned at both ends can be prevented from being adjusted so as to perform discharge causing an extremely large characteristic value or an extremely small characteristic value.

The characteristic value may be adjusted so as to gradually increase or decrease from a position where the characteristic value is initially adjusted. Therefore, the characteristic value after adjustment may be a larger characteristic value or a smaller characteristic value as the position is farther from the position where adjustment is performed first. Therefore, when the head positioned at the center is set as the center of the adjustment to perform the adjustment, the droplet discharge apparatus can set the positions of both ends at a short distance from the position where the adjustment is performed first. Therefore, the droplet discharge apparatus can prevent the heads positioned at both ends from being adjusted to perform discharge causing an extremely large characteristic value or an extremely small characteristic value.

First Modification

It is preferable that the droplet discharge apparatus further includes a setting unit capable of arbitrarily setting the discharger to be adjusted first. That is, in the adjustment, it is desirable that the user can set the discharger serving as a reference. For example, there may be more dischargers having a higher characteristic value at the right end than at the left end. In such a case, when the discharger positioned at the center is adjusted as the center of adjustment, the discharger positioned at the rightmost end may be set to have an extremely high characteristic value. Therefore, if the setting unit can set the discharger serving as the center of adjustment, other dischargers can be prevented from being adjusted so as to perform discharge causing an extremely large characteristic value or an extremely small characteristic value.

Second Modification

The droplet discharge apparatus may first adjust a discharger located at an end in a direction in which the plurality of dischargers are arranged. For example, the width of a recording medium, which is a dimension in the X direction in the example illustrated in FIG. 3, may be narrow. The droplet discharge apparatus may use only the discharger located at the end, among the plurality of dischargers, depending on image data or the like.

In such a case, it is desirable that the droplet discharge apparatus be set such that the discharger to be adjusted first is the discharger positioned at the end. Such a setting can prevent the droplet discharge apparatus from being adjusted so as to perform discharge causing an extremely large characteristic value or an extremely small characteristic value in, for example, a case where only the discharger positioned at an end is used.

Functional Configuration

Figure 7:
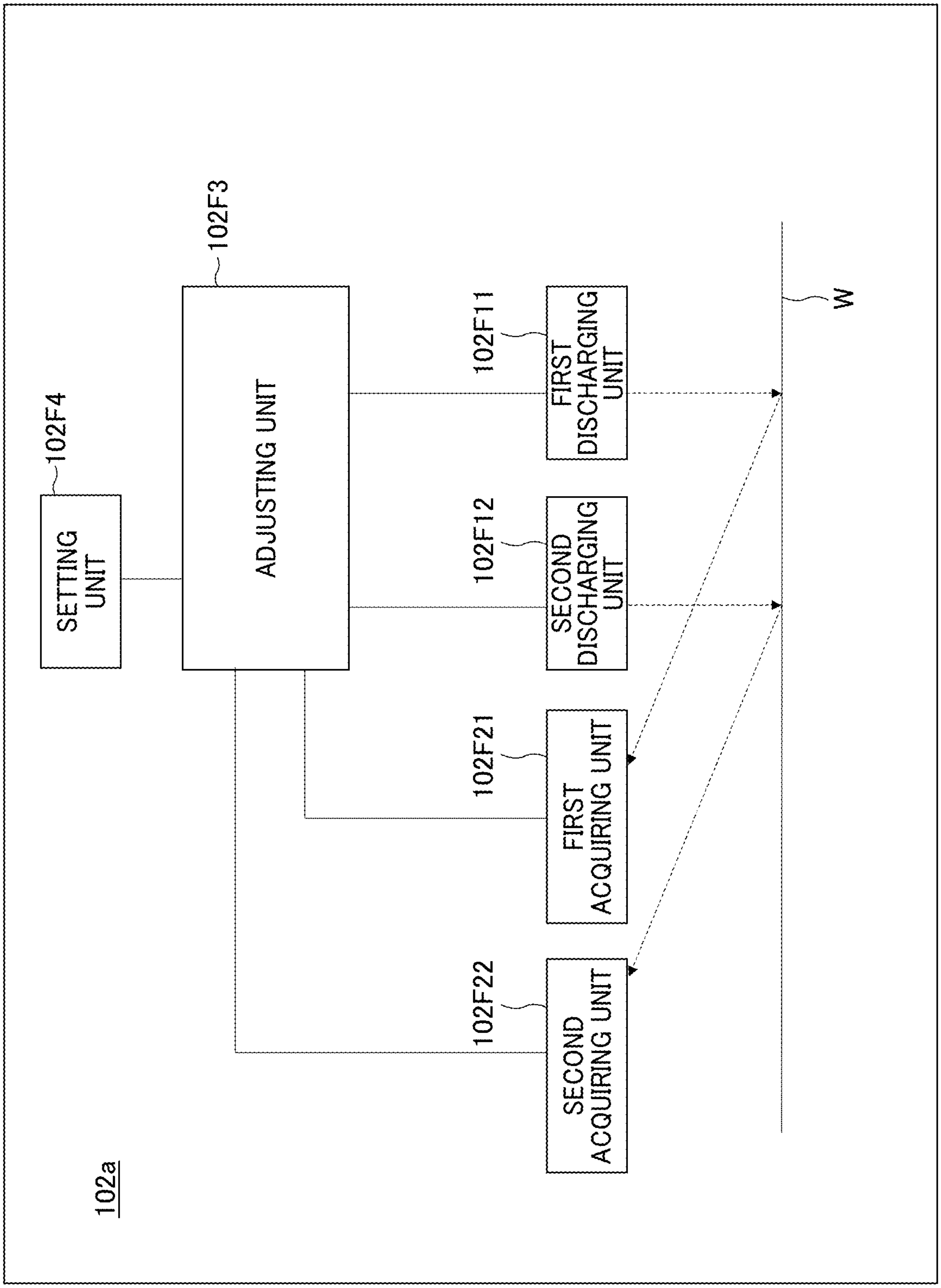
FIG. 7 is a diagram illustrating a functional configuration according to an embodiment of the present disclosure.

FIG. 7 is a diagram illustrating an example of the functional configuration. For example, the droplet discharge apparatus includes a plurality of discharging units such as a first discharging unit 102F11 and a second discharging unit 102F12. Further, the droplet discharge apparatus has a functional configuration including a first acquiring unit 102F21, a second acquiring unit 102F22, and an adjusting unit 102F3. In addition, it is preferable that the droplet discharge apparatus further includes a setting unit 102F4.

The first discharging unit 102F11 and the second discharging unit 102F12 perform a discharge procedure of discharging droplets to respective end portions in a plurality of adjacent areas. For example, the first discharging unit 102F11 and the second discharging unit 102F12 are implemented by the first head HE1 to the fifth head HE5.

The first acquiring unit 102F21 and the second acquiring unit 102F22 perform an acquisition procedure of measuring the end portions and acquiring characteristic values of the respective end portions. For example, the first acquiring unit 102F21 and the second acquiring unit 102F22 are implemented by, for example, the colorimeter and the control device 11.

The adjusting unit 102F3 performs an adjustment procedure of adjusting the first discharging unit 102F11 and the second discharging unit 102F12 such that the difference between the characteristic values is within a predetermined range. For example, the adjusting unit 102F3 is implemented by, for example, the control device 11.

With the above-described functional configuration, the droplet discharge apparatus can perform adjustment as follows, for example.

Figure 8:
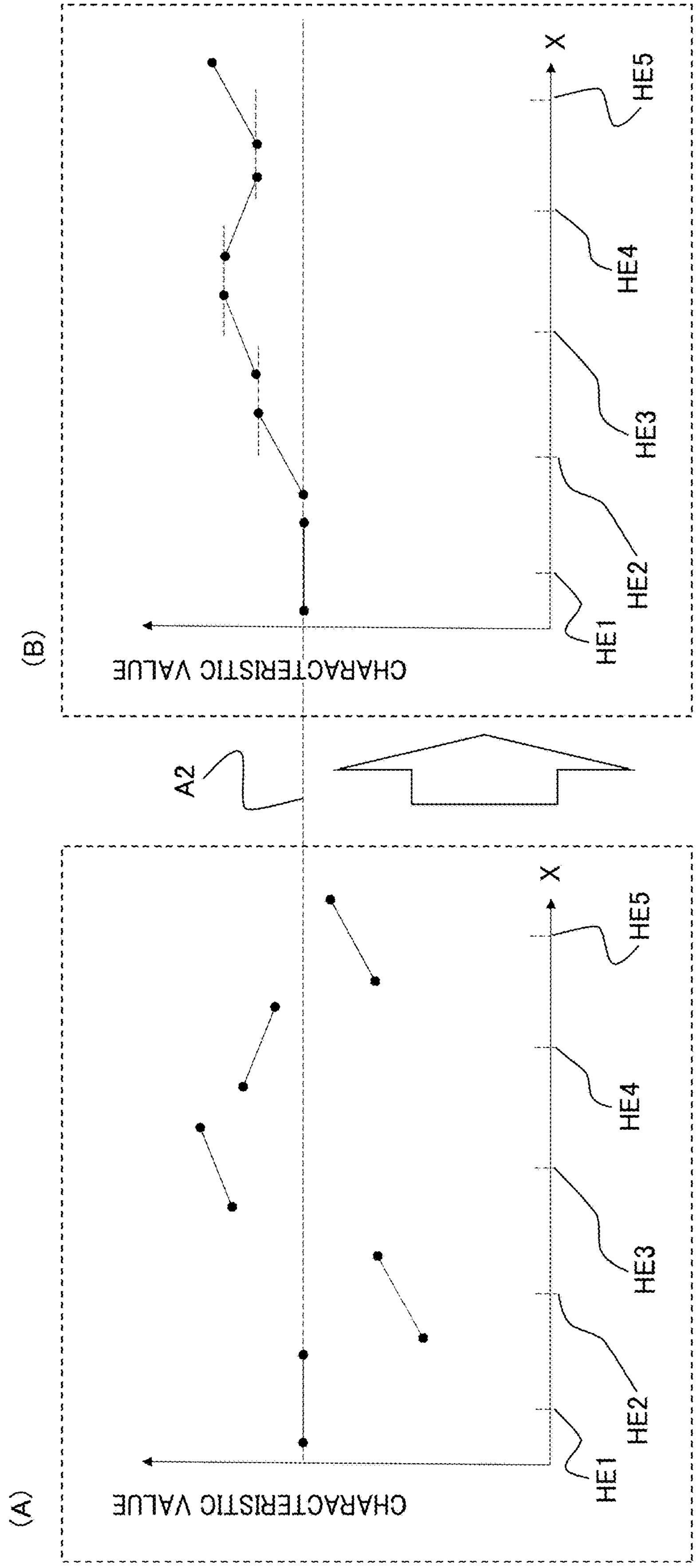
FIG. 8 is a diagram illustrating examples before and after adjustment in the present embodiment.

FIG. 8 is a diagram illustrating examples before and after adjustment in the present embodiment. Specifically, part (A) of FIG. 8 is a diagram illustrating an example before adjustment. Part (B) of FIG. 8 is a diagram illustrating an example after the adjustment.

For example, as illustrated in part (A) of FIG. 8, the characteristic values of the respective heads vary in a state before adjustment. As illustrated in part (A) of FIG. 8, even in the same head, there may be a difference in density as the characteristic value between the left end portion and the right end portion. Therefore, the droplet discharge apparatus performs adjustment between adjacent end portions, focusing on the density at the end portions.

For example, as illustrated in part (B) of FIG. 8, the droplet discharge apparatus performs adjustment so as to eliminate the difference between the characteristic values. For example, as illustrated in FIG. 3, the droplet discharge apparatus discharges droplets to end portions in a plurality of adjacent areas to produce a chart having a predetermined patch. When such a chart is measured, the droplet discharge apparatus can determine a difference in characteristic value generated between respective end portions in a plurality of adjacent areas. The droplet discharge apparatus sets each voltage for driving the discharger so that the difference between the characteristic values is within a predetermined range. This setting can reduce the difference in characteristic value between the end portions of a plurality of adjacent areas and form an image such as a plane having uniform density. Thus, density unevenness can be reduced.

Comparative Example

Figure 9:
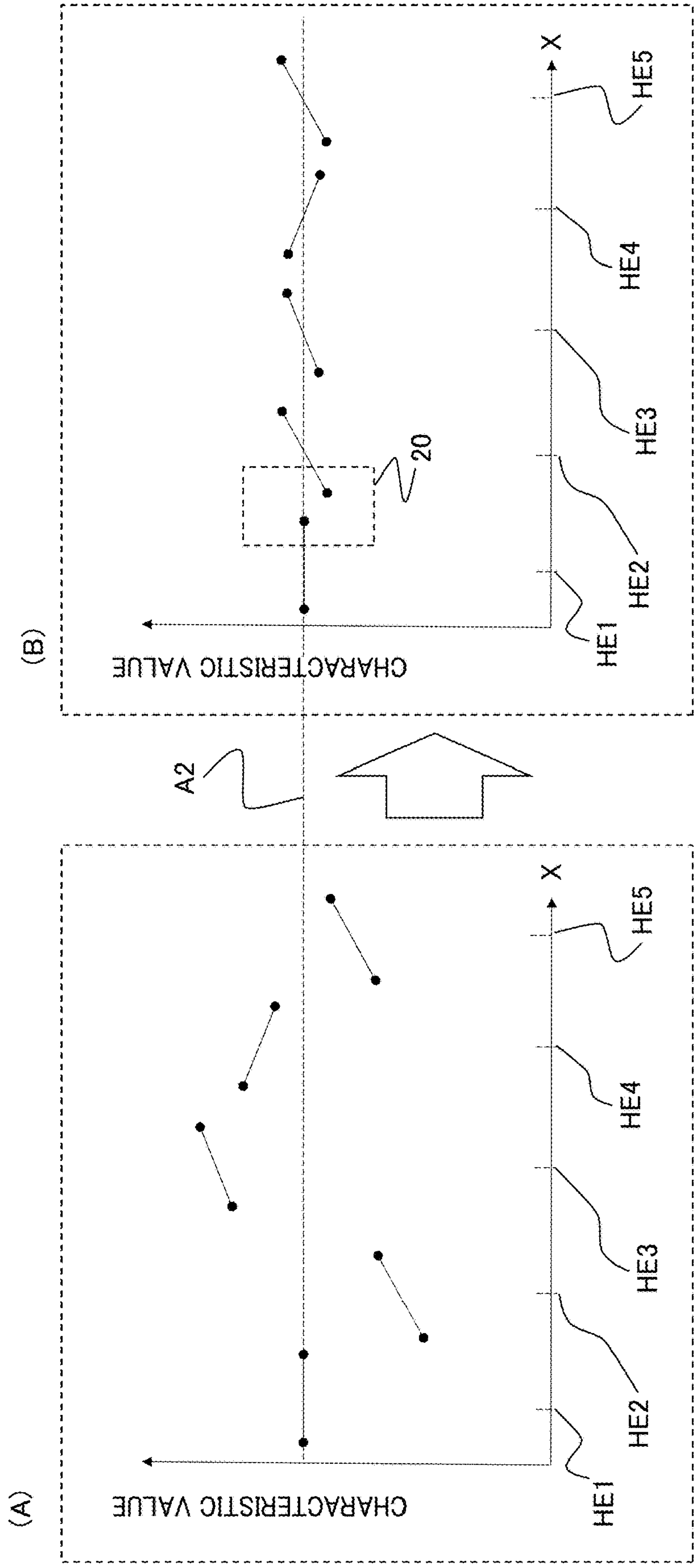
FIG. 9 is a diagram illustrating a comparative example.

FIG. 9 is a diagram illustrating a comparative example. An example before adjustment illustrated in part (A) of FIG. 9 is similar to the example illustrated in part (A) of FIG. 8.

In the comparative example, adjustment is performed such that all of the plurality of dischargers match an adjusted value A2. For example, as illustrated in part (B) of FIG. 9, the respective dischargers are adjusted so that the average value of the respective dischargers matches the adjusted value A2.

Such adjustment results in a difference in the characteristic values at the ends (for example, a difference 20 in the example illustrated in part (B) of FIG. 9). If there is such a difference, the difference is likely to be strongly recognized as density unevenness when an image is formed.

Other Embodiment

As the characteristic value, for example, a coordinate value in a color space may be used instead of the density. In this case, the difference between the characteristic values is the distance between the coordinate values. As described above, even when the distance in the color space is controlled to be short, the droplet discharge apparatus can reduce density unevenness.

The droplet discharge apparatus may be a single apparatus or a combination of a plurality of apparatuses.

The droplet discharge apparatus may discharge droplets of a liquid other than ink to perform a process other than image formation on a conveyed object.

The conveyed object may be a continuous form, which may be referred to as "continuous form", "continuous sheet of paper", "LP paper", "form paper", "fanfold paper", or the like. Note that the continuous form may be a so-called "Z paper". Further, the conveyed object is not limited to the roll paper, and may be cut paper or the like.

The conveyed object is, for example, a recording medium such as a sheet of paper (also referred to as "plain sheet of paper" or the like). However, the recording medium may be an overhead projector sheet, a film, a flexible thin plate, or the like in addition to coated paper, label paper, or the like other than a sheet of paper.

In other words, the recording medium (or a recording medium that is used for an inkjet image forming apparatus) is made of a material to which droplets of liquid are at least temporarily adherable, a material to which droplets adheres and fixes, or a material to which droplets adheres and permeate. Specific examples of a recording material or formation made of such a material include, but are not limited to, a recording medium such as a sheet, a film, or cloth, an electronic component such as an electronic substrate or a piezoelectric element (which may be referred to as a piezoelectric component), layered powder, an organ model, and a testing cell.

In short, the recording medium is made of any material to which droplets are adherable, such as paper, thread, fiber, fabric, leather, metal, plastic, glass, wood, ceramic, or a combination thereof.

The adjustment method may be implemented by a program or the like, for example. That is, the adjustment method may be executed by causing an arithmetic device, a storage device, an input device, an output device, and a control device to operate in cooperation with each other based on a program.

Embodiments of the present disclosure are not limited to the above-described embodiments, and various modifications can be made without departing from the technical scope of the present disclosure. It is therefore to be understood that the disclosure of the present specification may be practiced otherwise by those skilled in the art than as specifically described herein. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A droplet discharge apparatus, comprising:

a plurality of dischargers configured to discharge droplets, wherein the plurality of dischargers are arranged in a substantially linear direction, wherein each discharger of the plurality of dischargers comprises a plurality of nozzles configured to discharge the droplets, wherein each discharger of the plurality of dischargers is configured to controllably discharge a volume of droplets at a right end portion of said each discharger and at a left end portion of said each discharger, and a control device configured to acquire characteristic values of adjacent left and right end portions of areas on which the droplets discharged by adjacent pairs of dischargers of the plurality of dischargers land, wherein the control device is configured to acquire the characteristic values from measurements of the end portions, the control device being configured to adjust the plurality of dischargers such that a difference between the characteristic values at adjacent left and right end portions is within a range.

2. The droplet discharge apparatus according to claim 1, wherein the control device is configured to set a voltage for driving each of the plurality of dischargers.

3. The droplet discharge apparatus according to claim 1, wherein the control device is configured to adjust, first among the plurality of dischargers, a discharger positioned at a center in a direction in which the plurality of dischargers are arranged.

4. The droplet discharge apparatus according to claim 1, wherein the control device is configured to set a discharger to be first adjusted among the plurality of dischargers.

5. The droplet discharge apparatus according to claim 1, wherein the control device is configured to adjust, first among the plurality of dischargers, a discharger positioned at an end in the substantially linear direction in which the plurality of dischargers are arranged.

6. The droplet discharge apparatus according to claim 1, wherein the characteristic values are densities.

7. The droplet discharge apparatus according to claim 1, wherein the characteristic values are coordinate values in a color space.

8. A droplet discharge apparatus, comprising:

a first discharger, comprising a plurality of nozzles, configured to discharge droplets to a first area;

a second discharger, comprising a plurality of nozzles, configured to discharge droplets to a second area adjacent to the first area;

a control device configured to:
acquire a first characteristic value from a measurement of the first area on which the droplets discharged by the first discharger land;
acquire a second characteristic value from a measurement of the second area on which the droplets discharged by the second discharger land; and
adjust the first discharger so that a difference between the first characteristic value and the second characteristic value to be within a range.

9. An adjustment method, comprising:
discharging droplets from a plurality of dischargers of a droplet discharge apparatus, wherein the plurality of dischargers are arranged in a substantially linear direction, wherein each discharger of the plurality of dischargers comprises a plurality of nozzles configured to discharge the droplets, wherein each discharger of the plurality of dischargers is configured to controllably discharge a volume of droplets at a right end portion of said each discharger and at a left end portion of said each discharger;
acquiring characteristic values of adjacent left and right end portions of areas on which the droplets discharged by adjacent pairs of dischargers of the plurality of dischargers land, from measurements of the end portions; and
adjusting the plurality of dischargers such that a difference between the characteristic values at adjacent left and right end portions is within a range.

* * * * *